US007194275B2

(12) United States Patent
Bolin et al.

(10) Patent No.: US 7,194,275 B2
(45) Date of Patent: Mar. 20, 2007

(54) POSITION DETERMINATION OF MOBILE STATIONS

(75) Inventors: Johan Bolin, Uppsala (SE); Rune Johansson, Upplands Vasby (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 10/953,502

(22) Filed: Sep. 30, 2004

(65) Prior Publication Data

US 2005/0113117 A1 May 26, 2005

Related U.S. Application Data

(60) Provisional application No. 60/507,516, filed on Oct. 2, 2003.

(30) Foreign Application Priority Data

Dec. 5, 2003 (SE) .................................. 0303293

(51) Int. Cl.
*H04Q 7/20* (2006.01)
(52) U.S. Cl. ................ 455/456.6; 455/456.1; 455/456.2; 455/456.4
(58) Field of Classification Search ............ 455/414.1, 455/404.2, 404.1, 403, 456.1, 456.2, 456.3, 455/456.4, 456.5, 456.6
See application file for complete search history.

(56) References Cited

U.S. PATENT DOCUMENTS

| 2002/0090965 | A1* | 7/2002 | Chen et al. .................. 455/522 |
| 2003/0008664 | A1 | 1/2003 | Stein et al. |
| 2003/0222819 | A1* | 12/2003 | Karr et al. .................. 342/457 |
| 2003/0222820 | A1* | 12/2003 | Karr et al. .................. 342/457 |
| 2005/0053042 | A1* | 3/2005 | Boyd et al. .................. 370/336 |

* cited by examiner

*Primary Examiner*—Duc M. Nguyen
*Assistant Examiner*—Justin Lee
(74) *Attorney, Agent, or Firm*—Nixon & Vanderhye P.C.

(57) ABSTRACT

In a cellular communications network, additional control signals comprising virtual base station identification data are distributed in the radio system from well defined locations by e.g. transmitters. Since there is a connection between each virtual base station identification data and the location from where it is transmitted, a mobile terminal can use the information for improving its position estimation according to conventional procedures. No modifications of the mobile terminals are therefore necessary. The mobile terminal is not able to connect to the communications system using the virtual base station identification data, since this data only is intended for position estimating purposes. In such a way, the devices for providing the additional information necessary for the improved position estimation can be made very simple and inexpensive.

21 Claims, 7 Drawing Sheets

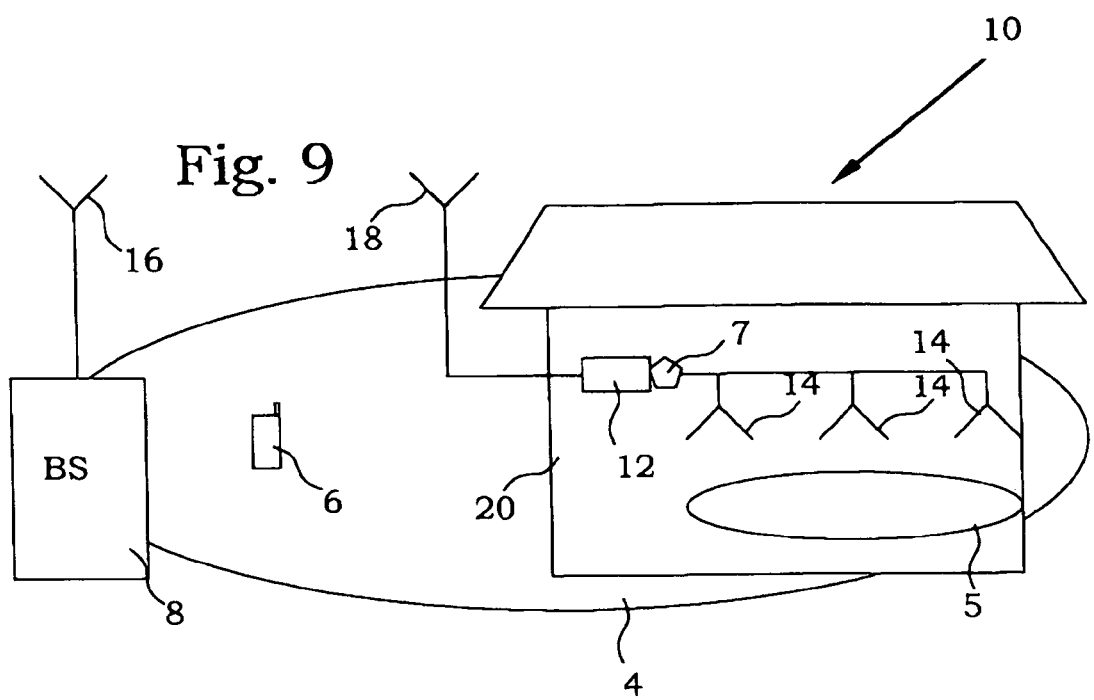
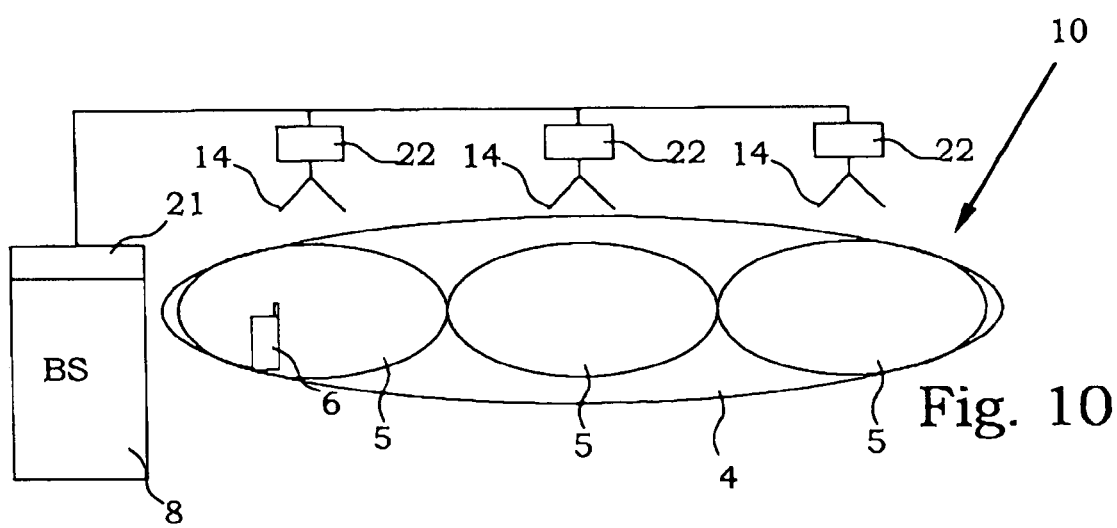
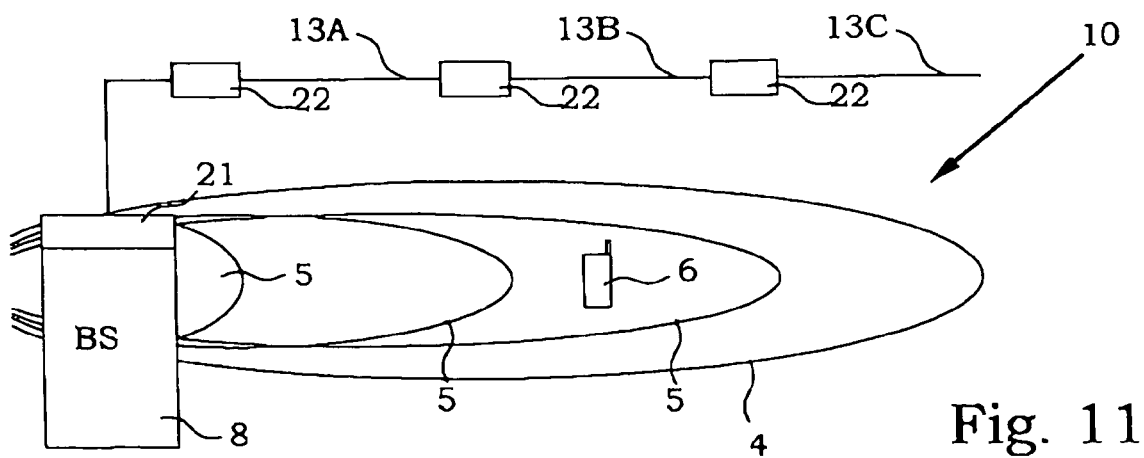

POSITION DETERMINATION OF MOBILE STATIONS

This application claims priority to U.S. provisional Application No. 60/507,516, filed 2 Oct. 2003. The entire contents of this application are incorporated herein by reference.

TECHNICAL FIELD

The present invention relates in general to cellular communications systems and in particular to estimation of a location of a mobile terminal in such a system.

BACKGROUND

The possibility to determine the position of a mobile device has enabled application developers and wireless network operators to provide location based, and location aware, services. Examples of those are guiding systems, shopping assistance, friend finder and other information services giving the mobile user information about their surroundings.

In addition to the commercial services, the governments in several countries have also put requirements on the network operators to be able to determine the position of an emergency call. For instance, the governmental requirements in USA (FCC E911) requires that it must be possible to determine the position of a certain percentage of all emergency calls. There is no difference between the requirements put on indoor environments compared to outdoor environments.

In outdoor environments, the position estimation can be done using external methods for position determination, e.g. GPS (Global Positioning System) based methods like Assisted-GPS (A-GPS). Position estimation can also be performed using the wireless network itself. Methods using the wireless network can be grouped in two main groups. The first group comprises methods that are based on the radio cell to which a mobile terminal is attached, e.g. by using Cell-ID. The second group uses measuring of radio signals from several base stations (BS) and determining the terminal position using e.g. Time Difference (TD).

In order to be able to connect to a mobile network or to perform handover when connected, a mobile terminal typically constantly measures available signals, not only from the own base station, but also from other base stations. These signals are typically control signals intended for measuring radio conditions of transmissions, which control signals contain, among other data, information about how to establish a connection to the transmitting base station. In particular, the control signals comprise data, which by itself or in combination with the frequency of the carrier on which the control signal was transmitted constitute base station identification data. A mobile terminal can thus obtain an identity of the transmitting base station and an estimate of the radio conditions. The mobile terminal typically compiles this information, in GSM (Global System for Mobile communications) in a neighbor list, which is transferred to the network as information.

Position estimation can be based on measurements in the neighboring list. One then uses the relation between the distance from the radio base station and the radio condition in combination with knowledge about the exact position of the base station. The base station positions are known within the communications network. This means that the neighbor list easily can be used for position estimating according to different algorithms. The accuracy of the position estimation is generally proportional to the size of the cell.

Triangulations, or Time Difference (TD) methods, use signals associated with two or more different base stations. These signals are used to calculate the position or at what distance from the base station a mobile terminal is located. The calculations are based on the relative or absolute difference in the time it takes the signal to propagate between the terminal and the different base stations. The achievable accuracy of TD-methods depends on system architecture, physical conditions and radio conditions. Typically, the accuracy of a TD method in a mobile telephony system is 50 to 150 meters. TD methods are also relatively time and resource consuming.

Fingerprinting methods use the fact that all places have a, more or less, unique characteristic signature of the received radio signals. This is the result of multi-pathing and reflections in the buildings and obstacles. By storing the characteristic radio signature of different locations in a database, it is possible to determine the location of a device by comparing the received signature of a signal with the signatures stored in the database. Fingerprinting methods requires an always-updated database. A good result typically also relies on being able to match signals from several different sources or base stations.

A terminal located indoor typically has a connection to a base station covering the surrounding outdoor area that is of lower quality than if the terminal would have been located outdoors. To improve the indoor coverage situation, many larger buildings are equipped with indoor mobile telephony system. The indoor system most often consists of one base station and a distributed antenna system or a leaking cable antenna. For a building spread over large areas repeaters are typically used. This results in that the entire building appears as one large radio cell and that it is impossible to determine where the terminal is located within the building. Furthermore, due to weak signals from base stations located outdoors, more sophisticated methods using e.g. triangulation is normally impossible to apply.

One straightforward solution is to use an additional system for positioning, a system that is not based on any mobile telephony system. This can be an indoor GPS system, a WLAN (Wireless Local Area Network) or a Bluetooth based system or some other sensor solution. However, such systems require additional complex equipment and also the terminals have to be equipped with special hardware and/or software, which makes the solution expensive.

Another straightforward solution is to increase the number of indoor base stations, thus reducing the size of the cells. However, a base station is an expensive piece of equipment and such a solution would therefore become very costly.

In the published US patent application US 2003/0008664 A1, a method and apparatus for estimating the position of a terminal within a radio system having a repeater is disclosed. A dedicated identity code is transmitted for each repeater. The terminal is provided with hardware and/or software for receiving and interpreting these codes. In a preferred embodiment of a CDMA system, the identification codes can be implemented with pseudo-noise sequences at defined offsets, specifically reserved for repeater identification. The repeater identity can then be used to give an improved position estimation. Such a solution has the drawback that it typically needs additional software in the terminals for being able to identify the dedicated identity codes as well as additions in different communications standards, even if some special solutions may be possible within existing frames of standards.

SUMMARY

In prior art solutions, an improved accuracy in position estimation is associated with large investments in expensive additional equipment. Furthermore, some solutions require that special hardware or software is added to the mobile terminals, which means that all terminals already on the market either will not be possible to position, or that they must be upgraded. Moreover, solutions operable within present or near future standards are to prefer.

An object of the present invention is thus to provide for position estimation of mobile terminals with improved accuracy that involves limited investments in additional equipment. A further object of the present invention is to provide methods and devices that do not require any changes in existing cellular standards and with no need for new or updated mobile terminals. Another object of the present invention is to provide for improved position estimation suitable to be comprised in systems involving distributed antenna systems, leaking cable antennas and/or systems comprising repeaters. Yet another object of the present invention is to provide for improved position estimation of indoor systems. Yet a further object of the present invention is to provide for position estimation giving a fast response.

The above objects are achieved by devices and methods according to the enclosed patent claims. In general words, additional control signals comprising virtual base station identification data are distributed in the radio system from well defined locations. There is a connection between each virtual base station identification data and the location from where it is transmitted, and a mobile terminal can use the information for improving its position estimation according to conventional procedures. Since the virtual base station identification data is provided in the same format as normal base station identification data, no modifications at all of the mobile terminals are necessary. However, the mobile terminal is not able to connect to the communications system using a cell associated with the virtual base station identification data, since this data only is intended for position estimating purposes. In such a way, the devices for providing the additional information necessary for the improved position estimation can be made very simple and inexpensive.

The mobile terminal can't a priori distinguish between virtual base station identification data and real base station identification data. In preferred embodiments of the present invention, the mobile is therefore prohibited even to attempt to connect to the communications system using a cell associated to the virtual base station identification data, or the probability for the mobile terminal to wanting to connect is at least reduced. Data expressing such prohibition explicitly can be transferred together with the virtual base station identification data. Another possibility to reduce the connection attempting probability is to control the power and/or quality of the control signals carrying the virtual base station identification data in such a way that the mobile terminal simply does not select the virtual base station identification data for connecting purposes.

The present invention can be applied to any cellular communication systems, but are particularly well suited to be implemented in indoor systems, especially such systems using distributed antenna systems, leaking cable antennas and/or repeaters.

The present invention has many advantages compared to prior art solutions. Since the present invention make use of already existing types of broadcast data but in a new way, the proposed embodiments are easy and inexpensive to introduce in already existing systems since the complexity of additional functionality or devices is low. Furthermore, mobile terminals already on the market can be used with the proposed system without any modifications at all. The delay between the request of making a position estimation and getting the result therefrom is also very low, since the terminal in some embodiments can determine its own position without sending a request to the system.

BRIEF DESCRIPTION OF THE DRAWINGS

The invention, together with further objects and advantages thereof, may best be understood by making reference to the following description taken together with the accompanying drawings, in which:

FIG. 9 is a schematic illustration of a communications system using a repeater according to an embodiment of the present invention;

FIG. 10 is a schematic illustration of a distributed antenna system according to yet another embodiment of the present invention;

FIG. 11 is a schematic illustration of a leaking cable antenna system according to yet another embodiment of the present invention;

DETAILED DESCRIPTION

In order to fully understand the operation of the present invention, first a short review of general position estimations in cellular networks is given.

Figure 1:
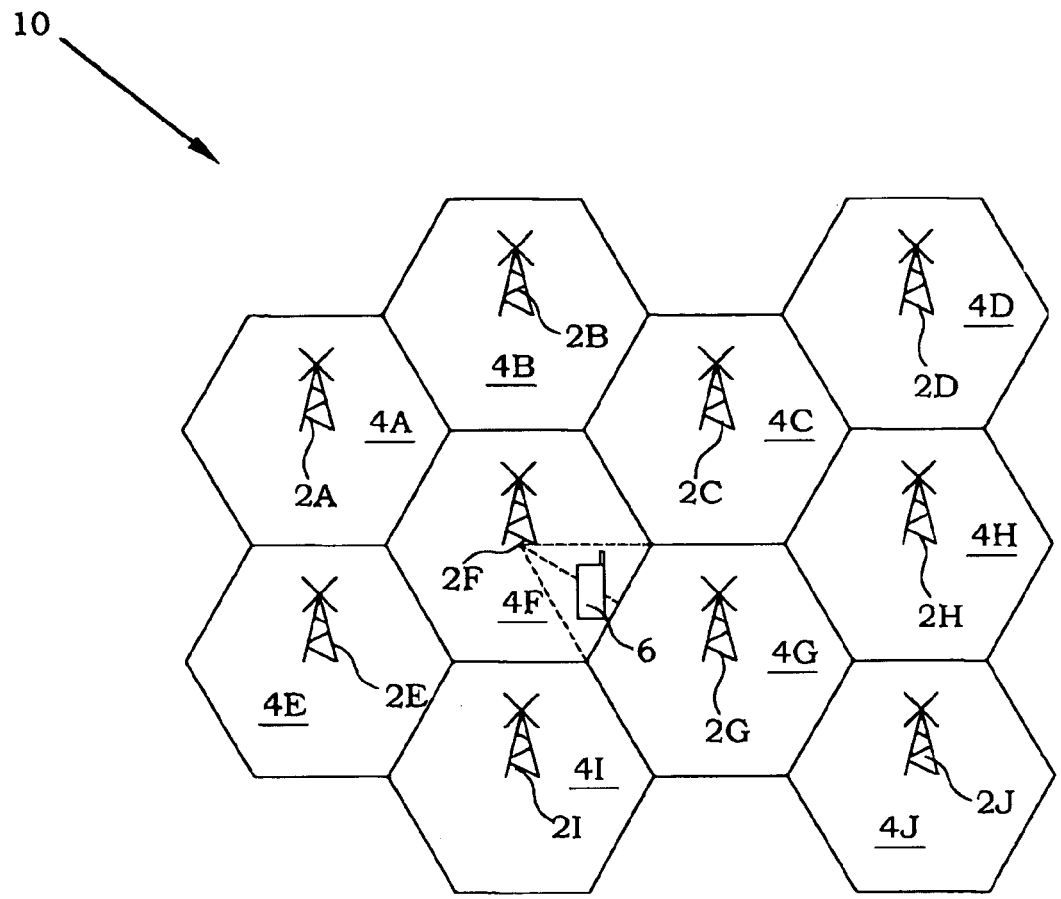
FIG. 1 is a schematic illustration of a cellular communications system.

The basic idea with cellular networks 10, one of which is schematically illustrated in FIG. 1, is to structure the network as a grid of cells 4A–J where each cell 4A–J is the area covered by one radio base station 2A–J. The communication takes place via different radio resources. To avoid interference between mobile phones 6 and radio base stations 2A–J in neighboring cells, the communication between the mobile phone 6 and the base station 2A–J uses different resources, i.e. slightly different configurations or settings, e.g. of frequencies or codes. The number of those resources or "configurations" is limited. In GSM systems, the resources are formed by a limited number of allowed carrier frequencies, and they are used to separate communication in different cells. In WCDMA (Wideband Code Division Multiple Access) systems, the resources are characterized by a limited number of different codes. The result of the limited number of radio resources means that it is important to plan the network 10 carefully.

Mobile Station (MS), Mobile Phone, Mobile Terminal and Handset all refers to the device that is to be positioned. These terms will be used in the present disclosure as equivalent expressions. This device is typically a mobile telephone, hand held computer so-called Personal Digital Assistance (PDA) or other device or apparatus equipped with a radio receiver for cellular or mobile networks.

In most cellular networks 10, the mobile terminal 6 continuously measures the receiving conditions of the radio signals. The reasons are several. One is to be able to modify the transmission power in order to avoid sending on unnecessary high transmission power. In general, but not necessarily, the radio base station with the best radio conditions is the one used for connection to the cellular network. The base station with the best radio conditions is in most cases also the one that is located closest to the mobile telephone 6. In FIG. 1, the mobile telephone 6 is connected via base station 2F. The mobile telephone 6 is thus located within the cell 4F of that particular base station 2F. The radio cell is defined as the area surrounding a base station, in which the base station is the base station with the best radio connection to a mobile telephone. Since the positions of the transmission points associated with the base stations are known by the cellular network, the identity of the base station with the best radio conditions hence also gives an approximate location estimate of the mobile telephone. The size of a cell is proportional to the density of base stations. In FIG. 1, one may therefore conclude that mobile telephone 6 is present within cell 4F.

In order to know which base station to connect to, the mobile telephones constantly measures signals sent also from other base stations. These signals are special control signals intended for measuring the radio conditions between the mobile telephone and the base stations. The signals contain, among other data, information about how to establish a connection to the base station sending the signal. As mentioned above, the communications in neighboring cells are done over links with slightly different configurations in order to avoid interference. The control signals are typically transmitted using those different configurations. As an example, in GSM, the control signal from one base station is sent on a different frequency than the control signal sent from the neighboring base station. However, base stations further away could use the same frequency in a reuse pattern. To be able to separate the base stations associated with different cells, but that are sending control signals on the same frequency, from each other, the control signals also contain other information making is possible to distinguish a control signal from one base station from the other. This information, alone or in combination with the frequency of the control signal, gives a possibility to identify a particular base station. In other words, the control signals comprise base station identification data. In GSM, so-called color codes are used to separate different base stations from each other.

The network typically informs the mobile terminal about which base stations that are present in the vicinity. The mobile telephone then knows what control signals to look for. The mobile telephone may also measure signals from each other base stations if the information to be measured is not accessible. This could be the case e.g. in areas where a user's operator has no coverage, but other operators have. The results of the measurements of the control signals sent from the base stations are typically stored in the mobile terminal in a compiled manner. Such a list of neighboring base stations or at least data corresponding to such a list is kept updated in the mobile terminal, and is often referred to as the neighbor list.

Figure 2:
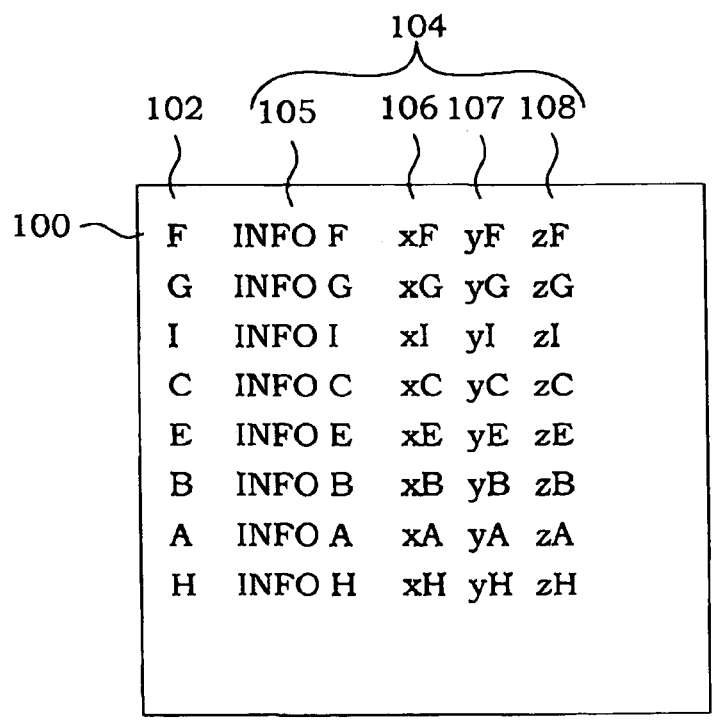
FIG. 2 is an illustration of the typical content of a neighbor list.

An example of such a neighbor list for the situation of FIG. 1 is illustrated in FIG. 2. The list is sorted based on the quality of the radio conditions, with the base stations having the best radio conditions on top of the list. Each row 100 of the list refers to one particular base station. In this example, the first column 102 comprises an identity of the base station. A second portion 104 comprises additional information. In the present embodiment, a second column 105 comprises general information. The third to fifth columns 106–108 comprise data associated with e.g. measures of the quality of the radio conditions to each base station, signal quality, barring flags or similar data important for handover decisions.

The measurements of such a list are continuously transferred to the base station to keep the network updated regarding radio conditions. The base station, or any network server connected to it can thereby retrieve the content of a neighbor list of any connected mobile terminal.

In the present disclosure, the expressions "position" and "location" will be used. Position is intended to mean a geographical position given as coordinates or degrees (e.g. the WGS-84 datum). It may also contain orientation and/or heading, speed, acceleration etc. A position may also be given as a relative measure. The location is a more subjective position defined by the type of (or relation to) facility or place. Examples of locations are: "military area/facility", "hospital", "office", "theatre", "near emergency exit". The expression "location" is assumed to comprise also what is comprised by "position".

The most trivial position estimation is to determine the approximate position as inside the cell of the base station with best radio connection with the mobile terminal, i.e. the base station at the top of the neighbor list. In FIG. 1, this means that it is possible to conclude with a certain probability that the mobile telephone 6 is situated within cell 4F. Using several entries in the neighbor list for different algorithms means that a better accuracy than the cell where the mobile phone is camping can be calculated. In FIG. 2, it is seen that base station 2G has the second position in the neighbor list. It is then very probable that the mobile telephone is situated in a 60° sector facing the cell 4G, marked with broken lines in FIG. 1. Furthermore, since base station 2I is the third entry in the neighbor list, it is also probable that the mobile terminal 6 is situated in the half of the sector that is closest to cell 4I. Additional accuracy can furthermore be achieved by considering e.g. signal strength ratios etc.

The translation or calculation translating the neighbor list to a position and/or location estimate may take place either in the cellular system or in the terminal. If the position estimation takes place in the system, e.g. in a network server, the mobile terminal has to transmit the neighbor list or measurements corresponding to it to the radio base station. If the mobile terminal itself performs the estimation, the estimation can in a basic concept e.g. comprise a determination of a closest base station in form of e.g. a cell-ID. Such position information can in certain cases be enough to support many of the services based on position determination. However, if the actual geographic position is to be estimated, the mobile terminal first needs information about the particular surroundings. Such information should contain at least the known positions of the different base stations and could e.g. be deduced from instructions concerning base stations to be measured. Other information that may be specific to the location, building or surroundings may also be useful. Such specific information about e.g. a specific building could comprise map information, from which it is possible to exclude certain areas where a mobile cannot be located from the position determination. It is e.g. obviously most likely that a mobile terminal is not located inside a wall of the building or hovering in the air 10 meters above the floor.

Figure 3:
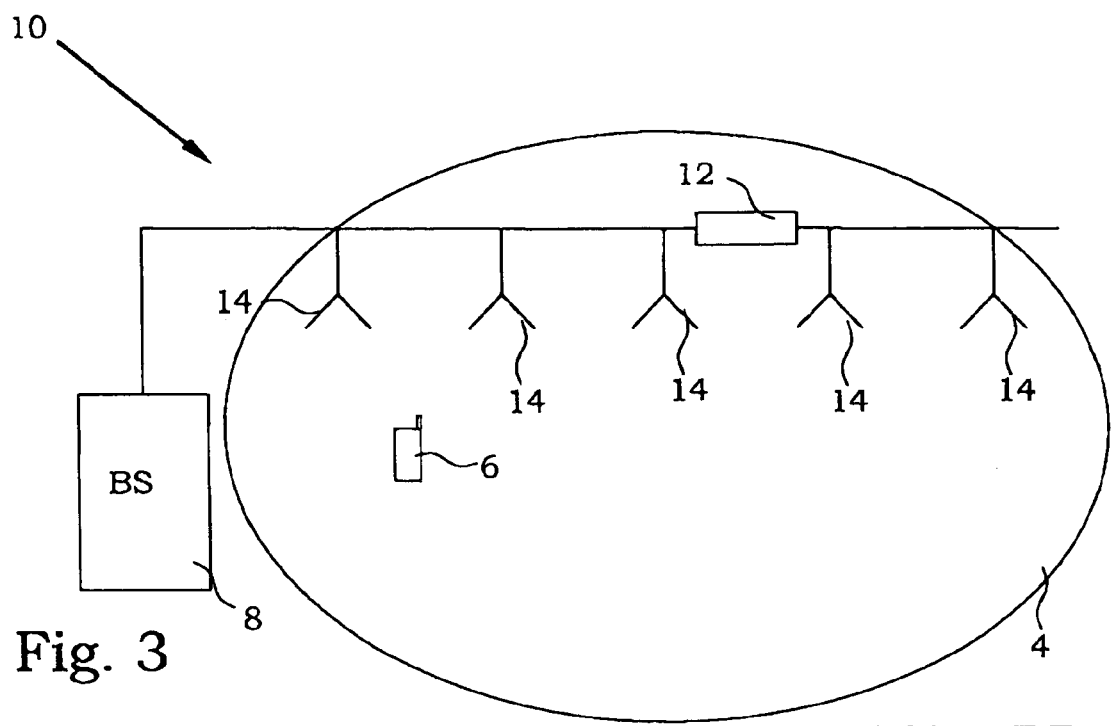
FIG. 3 is a schematic illustration of a distributed antenna system according to prior art.

Indoor coverage in cellular systems is often of a lower quality than outdoors. Therefore, many larger buildings have their own local cell or cells. A typical prior art system is illustrated in FIG. 3. One single base station 8 serves a distributed antenna system comprising a number of antennas 14 distributed over the indoor area. A repeater 12 can be present in order to enhance the signals during distribution. Since all antennas provides the same information, a mobile terminal 6 experiences all antennas 14 together as one transmitting system, being associated with one single cell 4. Furthermore, since the mobile terminal 6 is unaware of which antenna it is communicating with, refined position estimation as described above is less likely to operate well. One way to improve position estimation accuracy is to provide smaller cells.

In the present invention distributed antenna systems as well as leaking cable systems and subsystems that are fed by a repeater or any other active component are assumed to be particularly well suited for implementing the present invention. The term "antenna" is normally used both for an antenna in a distributed antenna system, but also for a section of a leaking cable on a leaking cable antenna.

The typically bad connections to the base stations for the outdoor coverage also makes it difficult or even impossible to use base stations located outdoors for triangulation purposes. Since only one base station often is used for the indoor coverage, it is impossible to use internal indoor triangulation for position determination. In some buildings that are spread over large areas (e.g. airports), repeaters are used. The cell then becomes even larger resulting in that the area in which the mobile phone is when connected to that cell is very large, i.e. the position estimation accuracy is low.

The accuracy of position estimation based on neighbor lists is basically proportional to the cell size. Smaller cells will generally give a better position estimation. However, cells are controlled by a base station, and base stations are generally very expensive. The functionalities of a base station that are used for position estimation are, however, very limited. In fact, if only control signals comprising base station identification data is transmitted from well-defined positions, this is enough for performing the positioning routines. The present invention is based on this understanding and therefore introduces "virtual" base stations or at least provides for transmitting "virtual" base station identification data.

The present invention is applicable to most cellular communications s networks. However, it is presently believed that it is particularly advantageous when applied to position estimation of mobile terminals located in a distributed antenna system, a leaking cable system or a sub-system fed by a repeater. The accuracy of the position determination method according to the invention depends on e.g. the premises or environment where the invention is to be implemented and other pre-requisites as well as various customer requirements. However, a position accuracy of 20–50 meters is believed to be realistic. The present invention could advantageously be used for positioning of mobile terminals located in indoor systems, underground railway systems (subways) and sub-systems connected to cellular macro systems, e.g. tunnels connected to a macro radio cell using a repeater.

The positioning method according to the present invention is primarily targeting positioning in cellular mobile radio systems. GSM is the mobile radiotelephony standard used in the exemplary embodiments presented in this disclosure. However, the present invention is also applicable on other cellular mobile radio systems and their related standards, such as e.g. other radio standards based on TDMA (Time Division Multiple Access), CDMA (Code Division Multiple Access), Wideband CDMA (WCDMA) and TDD (Time Division Duplex) technology.

The basic concept of the invention is to divide a larger cell into several smaller virtual cells that are not real radio cells in the sense that each of said particular virtual cells is not managed and controlled by a certain radio base station. The virtual cells are instead defined as being associated with a certain virtual base station identification data in turn associated with a certain position. The virtual base station identification data is provided into the radio interface by different control signals transmitted from the associated position. The virtual cell thus appears as the result of additional control signals, but of an already existing type, that are sent with the sole purpose of being used for position estimation.

In general, "virtual" is used to describe that a signal or a device appears to be a true signal or device only in certain aspects. In this disclosure, such an aspect is the purpose of determining the position of a mobile terminal. In other aspects, the "virtual" device or signal does not operate as a true signal or device of that kind. As an example, a "virtual" control signal is not a signal corresponding to a real cell and base station, but a signal only sent out to be used for position estimation. In a similar way, a "virtual" base station, that may be the one sending the "virtual" control signal, may e.g. be a simple transmitter sending control data and cannot be used for connecting the mobile terminal to the communications network. However, virtual base station identification data is as such not possible to distinguish from real base station identification data.

In a building or other area prepared with the equipment and configuration described in the exemplary embodiments of this disclosure, the position estimation is performed using the standard functionalities. In particular, measurement functionalities of the mobile terminal that normally is used for set up and configuration when the mobile terminal is connecting to the radio network can be used. One may, however, notice that virtual base stations typically are situated in the lower part of a neighbor list and the position determination algorithms may therefore have to be modified slightly in order to pay more attention to the information that is brought by the virtual control signaling.

Figure 4:
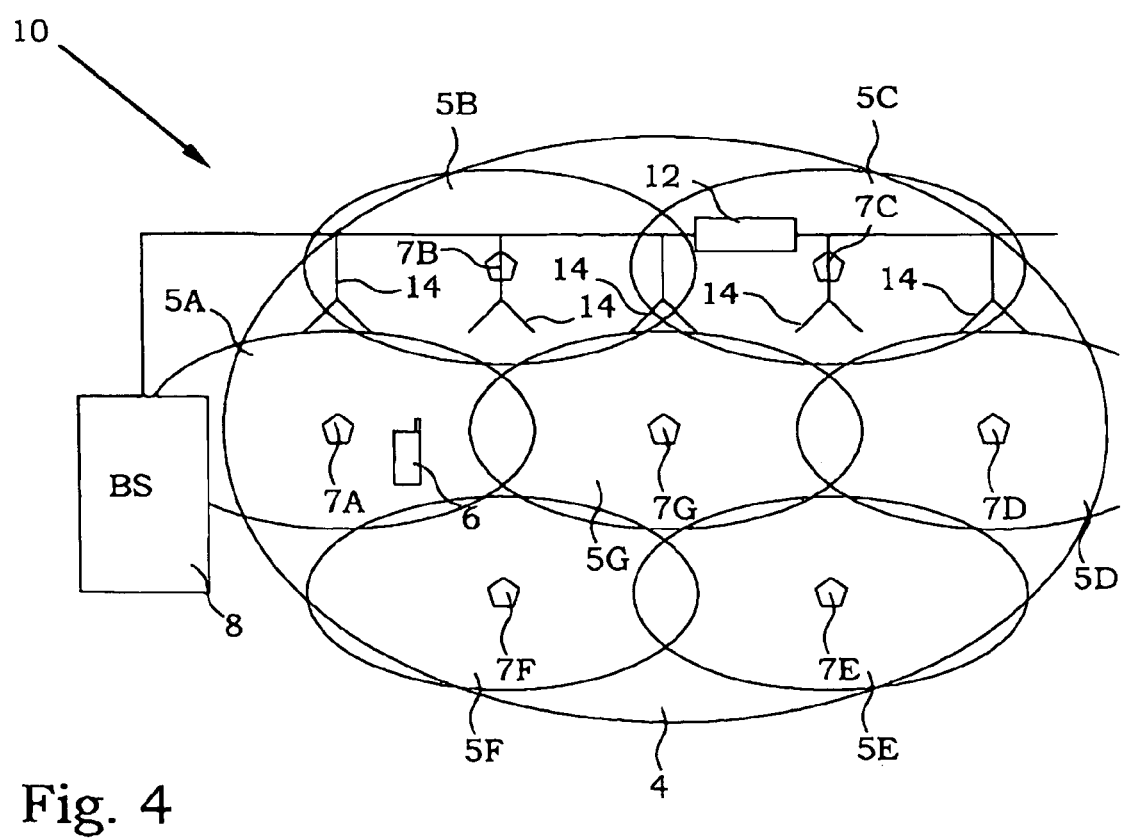
FIG. 4 is a schematic illustration of a distributed antenna system according to an embodiment of the present invention.

FIG. 4 illustrates an embodiment of a distributed antenna system according to the present invention. In addition to the parts and devices that are present in prior art systems, the system of FIG. 4 additionally comprises a number of transmitters 7A–G, distributed over the same area as covered by the distributed antennas 14. From each transmitter 7A–G virtual base station identification data specific for each transmitter 7A–G is transmitted. Because of this, a mobile terminal 6 being present in the cell 4 will also experience control signals comprising the virtual base station identification data. Since there are no a priori knowledge about whether the base station identification data is of a virtual type or not, the mobile terminal 6 interpret the transmitters 7A–G as antennas of regular base stations and has thus the impression that seven additional micro cells 5A–G are present. A network server comprising position determination means is provided with information about the position of each of these additional transmitters 7A–G via the base station 8, and a position determination can be performed according to normal routines. The mobile terminal 6 illustrated in FIG. 4 will create a neighbor list based on measurements, where the transmitter 7A is located highest of all the transmitters 7A–G. The mobile terminal 6 can thereby be located to be present within the virtual cell 5A. Further refinements in position accuracy can be achieved by also process information from the other transmitters 7A–G.

The transmitters 7A–G in the present embodiment are preferably small radio transmitters in the ceiling or in the walls of the building that are not necessarily directly connected to the mobile telephony network as normal communication nodes. The transmitters 7A–G are not able to handle any uplink data from a mobile terminal that is intended to be further communicated via the communications network. The transmitters 7A–G may have receiver means, but these means are only intended for communication between the network and the transmitter 7A–G, e.g. for controlling transmission frequencies or powers. In that sense, the transmitters 7A–G operate more like a user equipment. The precision is depending on the density and distribution pattern of transmitters and is therefore easily adapted to the specific local needs. The actual layout of the telephony system itself does not restrict the configuration of transmitters. The density may also vary between different locations in the building. Note, however, that for WCDMA one must consider the near-far interference problem. A separate transmitter located far from one of the real antennas may cause communication problems for a user located close to a virtual transmitter.

Figure 5:
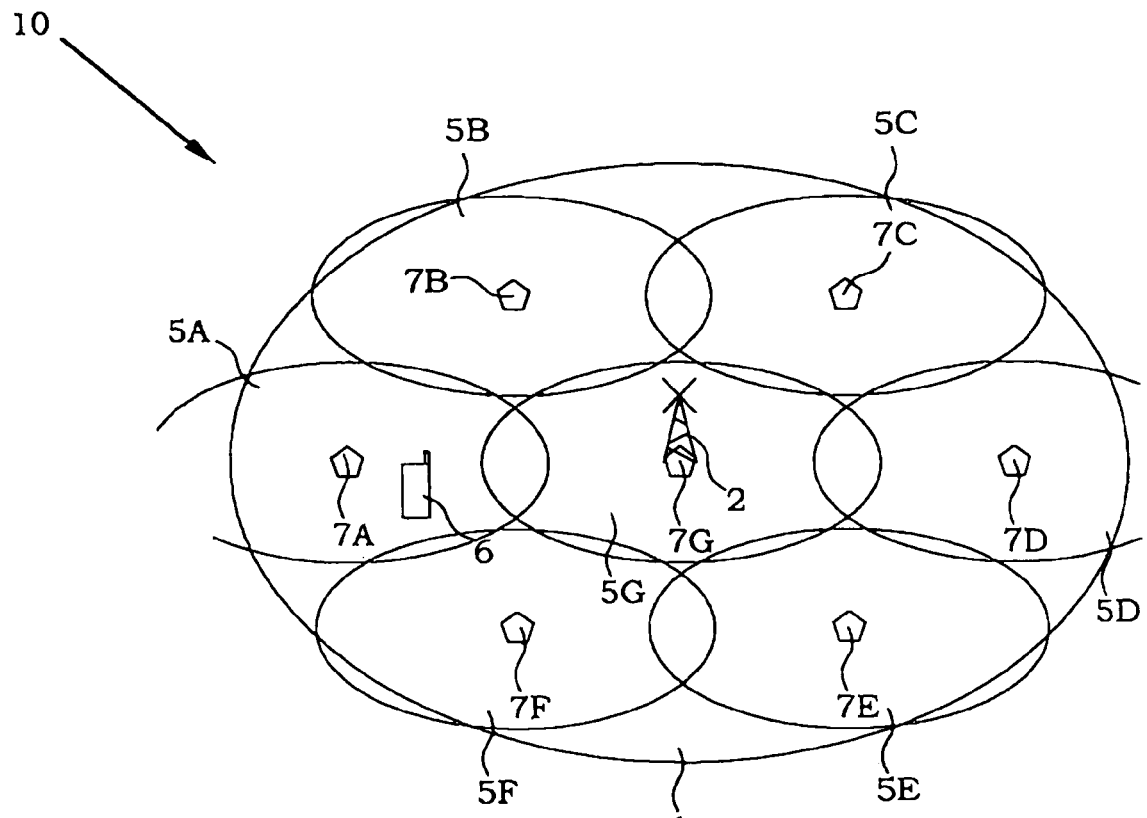
FIG. 5 is a schematic illustration of a general cellular communications system according to an embodiment of the present invention.

The general ideas of introducing virtual cells for positioning purposes can also be used in general cellular systems. In FIG. 5, a cell in a general cellular wireless communication system is illustrated. A base station 2 transmits control signals comprising base station identification data associated with the base station 2, and a cell 4 is associated with the base station 2. By introducing additional transmitters 7A–G at different positions within the cell 4, virtual cells 5A–G are defined. The transmitter 7G is co-positioned with the base station 2. From the mobile terminal 6 point of view, this system looks like a macro-micro-cell system, where the true cell 4 is a macro cell and the virtual cells 5A–G corresponds to micro cells. The accuracy in position determination is increased considerably by the addition of relatively inexpensive transmitter devices.

Figure 6:
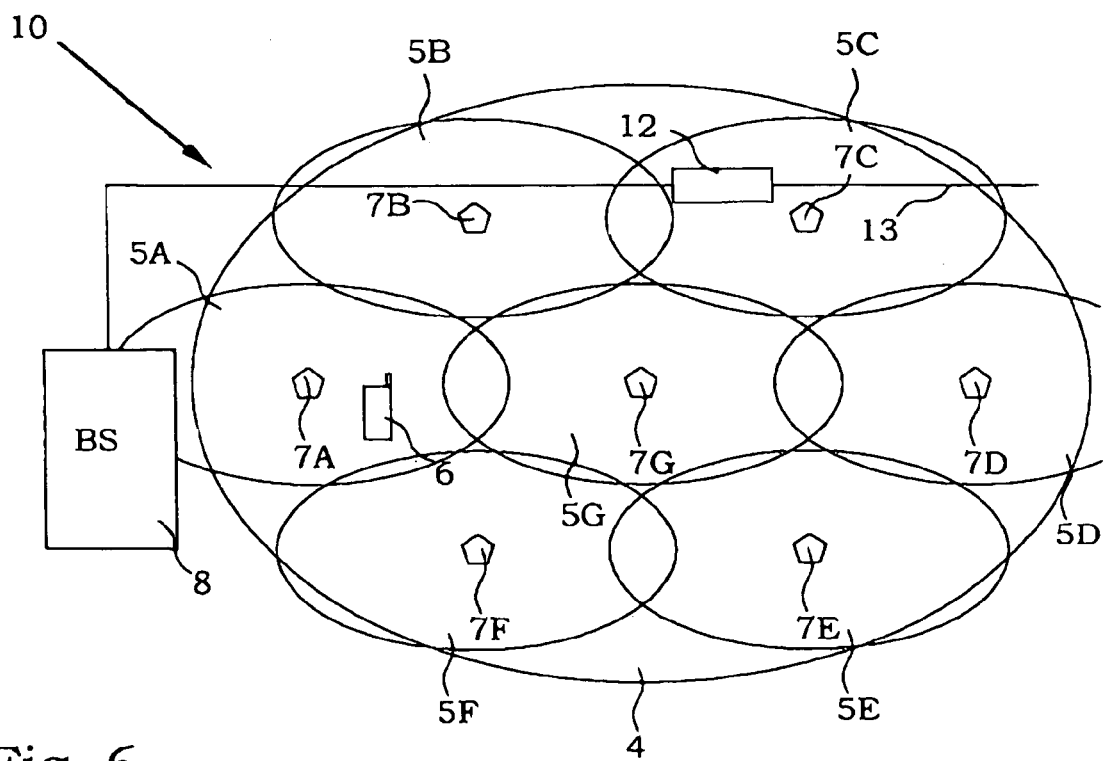
FIG. 6 is a schematic illustration of a leaking cable antenna system according to an embodiment of the present invention.

FIG. 6 illustrates a similar embodiment as in FIG. 4, but for a system using a leaking cable antenna 13. All principles from FIG. 4 are, however, the same.

Figure 7:
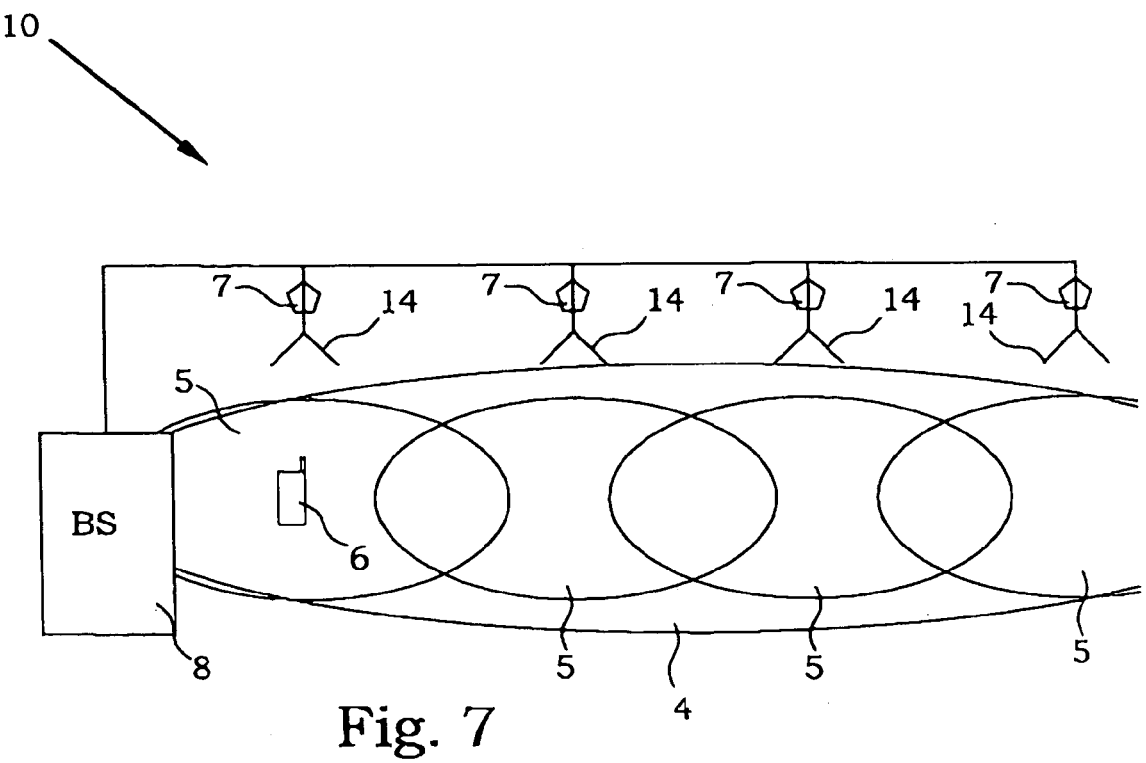
FIG. 7 is a schematic illustration of a distributed antenna system according to another embodiment of the present invention.

FIG. 7 illustrates another exemplary embodiment of the present invention. This embodiment differs from the embodiment of FIG. 4 in that the transmitters 7 here are integrated with the communications system itself, e.g. with the antennas 14. The transmitters 7 can then easily utilize the same antenna cable for any necessary communication with e.g. a control unit. The transmitters 7 can have their own antennas (not shown) or may share the antennas 14 used by the communication system. This will result in fewer devices in the ceiling and the possibility to control the transmitters 7 and feed it with power using the antenna cable.

Figure 8:
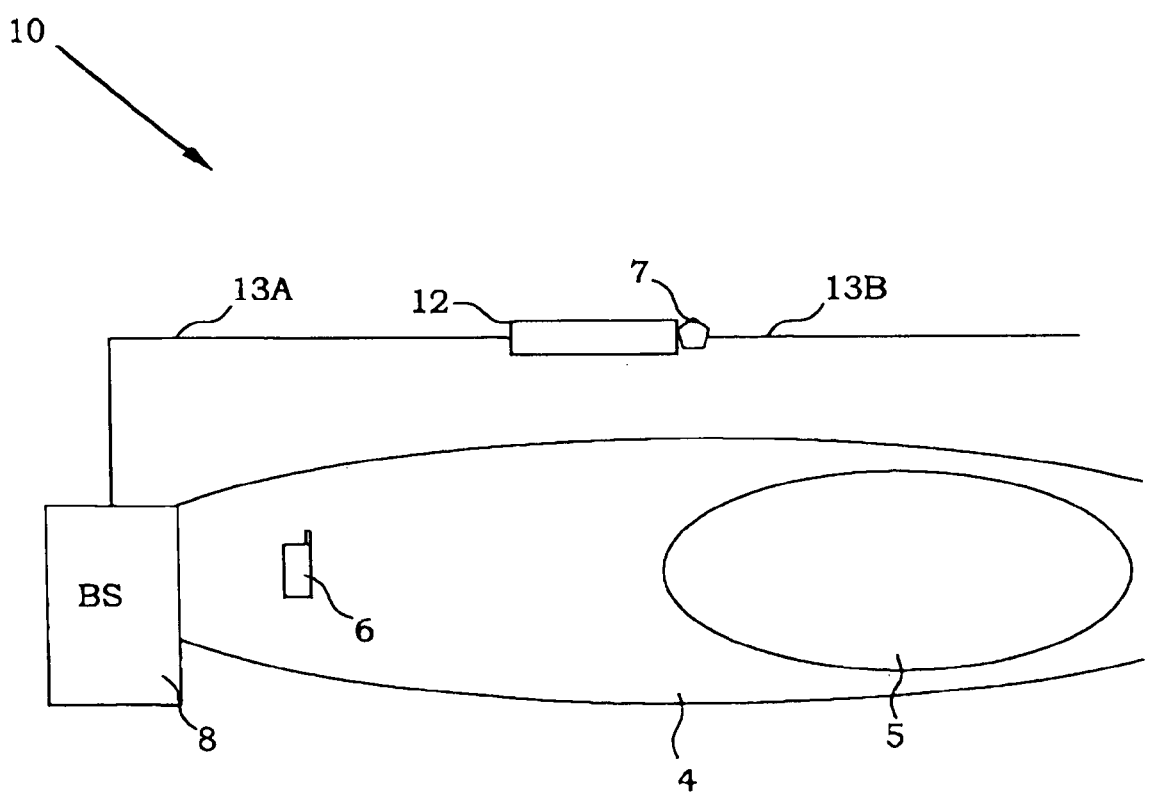
FIG. 8 is a schematic illustration of a leaking cable antenna system according to another embodiment of the present invention.

Many systems with distributed antennas and leaking cables also use different active components to increase the performance and/or coverage. One of the most commonly used active components is the repeater. Yet another exemplary embodiment of the present invention is illustrated in FIG. 8. Here a control signal transmitter 7 is integrated in the repeater 12 in a leaking cable system. The control signal comprising virtual base station identification data is transmitted only from the part 13B of the leaking cable system situated after the repeater. A virtual cell 5 thus characterizes the area around part 13B. Signals coming from the part 13A do not comprise this virtual data. Even if only the part of the area with the "virtual" signal is illustrated as a virtual cell, it is of course possible to determine if a mobile phone 6 is located in the other parts of the true cell 4 based on the fact that the "virtual" signal is not received or that the received signal strength is below a pre-defined threshold. This is the situation for the mobile terminal in FIG. 8.

In buildings using an indoor system with repeaters and where there are not very high requirements on the accuracy of the position, a solution with control signal transmitters integrated in e.g. a repeater may be good enough. This is a good way to optimize the use of a base station. At the same time as it covers a large geographical area it is also able to determine whether a mobile terminal is positioned in a particular sub-area or not.

Example of an application is in facilities with restrictions on mobile telephone use. A user should e.g. not be able to use the phone at certain parts of a large facility, e.g. at certain floors or inside a building of a hospital. Another application is in an underground railway system (subway), where it may be possible to determine between which stations a mobile phone presently is located.

Repeaters are also commonly used for connecting to an outdoor macro cell with an area with bad radio coverage e.g. a tunnel, a building or a vehicle. Such a situation is illustrated in FIG. 9. A base station 8 has an antenna 16 for the outdoor macro cell 4. The repeater based implementation is here suitable, since it makes it possible to determine if a mobile phone using the macro cell base station is located inside the building or not. A receiver 18 receives the signal and a repeater 12 feeds an indoor system of e.g. distributed antennas 14. Means 7 for adding control signals comprising virtual base station identification data is integrated together with the repeater and a virtual microcell 5 is created.

As mentioned above, the accuracy of the positioning in cellular networks increases if the density of base stations increases. By introducing virtual radio base stations, the mobile telephone in the network will experience this as a network with small cells. However, the network itself will not at all take the virtual radio base stations into consideration. The virtual cells are typically planned and ordered as regular cells in cellular networks, meaning that neighboring cells uses slightly separate configurations. The virtual cells are introduced in the network as seen from the mobile terminal by deploying extra control signals. In e.g. GSM and WCDMA, BCCH (Broadcast Control Channels) are used for these extra control signals, which are transmitted in addition to the normal control signals sent from the radio base station. Different control signals are associated with different transmission positions. In the mobile phone, the control signal will be received and interpreted as a control signal from an ordinary base station.

Since the transmitters of virtual bas stations identification data are not real base stations that can receive anything sent from the mobile telephones, the mobile telephones are not able to connect to the cellular network using a cell associated with the virtual bas stations identification data. Without any further arrangements, a virtual base station may be placed at the top of a neighbor list and the mobile telephone may therefore try to connect to the virtual base station in belief it is a real one. However, no communication can be established, and eventually the mobile telephone will give up its trials and move on to the next entry in the neighbor list. Such connection trials will cost a lot of battery power as well as long times for connections and handover. It is therefore preferable to apply a functionality that reduces the probability for, or even prevents, the mobile telephone from trying to connect.

A first approach to preventing or prohibiting a mobile terminal to try to connect to a virtual base station is to incorporate additional information in the virtual control signals indicating that connection is not possible using this base station identity data. This can be done by using data or flags telling that the base station, "real" or "virtual", will not be able to receive any traffic. In GSM and WCDMA systems, this can be accomplished using "cell barring". In GSM, the Cell_Bar_Access bit in the Information Element RACH Control Parameters can be set equal to 1. The RACH Control Parameters are included in the System Information Type 1, 2, 2bis, 2ter, 3, 4 and 9 messages that are broadcast on the BCCH to all mobiles within a cell. In WCDMA, the corresponding parameter "Cell Barred" is included in the Information Element Cell Access Restriction contained in the System Information Block Types 15.3 and 15.4 and also broadcast on the BCCH.

Another way to avoid that the mobile terminal tries to connect to the "virtual" base station is to ensure that the mobile telephone never or unlikely wants to connect to it. The reason for the mobile terminal not to want to connect to the base station is that the radio connection to the "virtual" base station never is allowed to appear as the best choice or even good enough to use. One way to reduce the probability that the mobile tries to connect is to configure the mobile terminal on purpose in such a manner that the mobile terminal unlikely tries to connect. Such configuration is typically broadcast as cell selection or cell re-selection data.

This can be achieved by carefully controlling the transmission power of the control signal sent from the virtual transmitter so that it never gets ranked high in the neighbor list.

This is indeed possible to implement in WCDMA systems. Firstly, the virtual control signals can be sent on the same frequency as the real control signal, but with a different scrambling code. In this scenario, the relative powers can be controlled if the virtual and real signals share the same antenna, such as in FIG. 7. Since the propagation channel between antenna and user then will be identical for both real and virtual control signals and there is no issue with frequency selective fading, a power difference at the antenna will end up in the same power difference at the receiving mobile terminal. For GSM, however, it may not be straightforward to control the relative power levels at the user location. This is so since the virtual control signals are sent on a different frequency than the real control signal. This means that frequency selective fading may cause the real control signal to be weaker than the virtual signal. In order to ensure that a virtual signal will not end up at the top position in a neighbor list, very large power margins have to be used.

It may also be possible to apply some kind of distortion on the virtual control signal so that the mobile telephone believes that the connection is bad. This is also possible to perform within the framework of WCDMA, since WCDMA also uses signal quality, expressed as estimated Ec/N0, as one of the cell selection criteria. However, in GSM, only signal strength is used as criteria for cell selection, not signal quality, which means that distortion will have no effect.

In a presently preferred embodiment of the present invention, the virtual transmitters are integrated in the cellular system. FIG. 10 illustrates a distributed antenna system configured according to such an embodiment. Several control signals are injected by a control signal injector 21 at a certain point in the network, e.g. at the base station 8. The signals are separated using e.g. frequency shift, code division or any other method to spread the signal. The signals are transferred over the antenna cable together with the real signals. At the position where the signal is to be used, a signal selector 22 selects the corresponding control signal and transforms it to a signal that can be received by the mobile terminal 6.

The control signal injector 21 is the apparatus that creates the downlink control signal (e.g. the BCCH in GSM) and injects them into the system. The control signal injector 21 generates a number (as many as the number of virtual-cells in the system) of "virtual" control signals, each with unique content, i.e. virtual base station identification data, that will be used to determine in what area a mobile phone is. The virtual base station identification data comprises typically different Cell-IDs, different Base Station Identity Codes (BSICs) or other information that makes one control signal different from the others. The control signal injector 21 also transforms and sends the signals in a way that it is possible to separate one signal from the other. This is typically done using e.g. frequency, code or time division as discussed below. At the signal selector 22 the signals are converted back into the original signal format.

The signal selector 22 has two main functionalities. The first is to separate out the right control signals to be used and the second is to convert the separated signals back to the correct original signal format to be received by the mobile phone 6. The signal selector 22 does only affect the control signals used to determine the location of the mobile phones 6. All other signals, e.g. the traffic data, are unaffected.

The signal selector 22 for a WCDMA system is a rather complex device. Here, codes are used to separate the different control signals. The signal selector 22 for WCDMA works as an interference canceller that must know which codes to let pass and which to cancel. An easier solution that is more bandwidth consuming is to spread the different control signals for the different antennas using frequency shifts, as proposed for GSM.

It is also possible to use one multiplexing technique between the true control signals, the true data traffic and the virtual control signals on the antenna cable, and another in the radio interface. For instance, if WCDMA is used over the air interface, the virtual control signals can anyway be frequency multiplexed in the signal on the antenna cable. The signal selector 22 will in such a case be responsible for the conversion.

A similar implementation is also possible in leaking cable systems. FIG. 11 illustrates such a system. The control signal injector 21 operates basically as described before. The complexity of the signal selector 22 is however slightly higher though. In a leaking cable system, the signal selector must not only select the signal to send as a control signal, it must also let all the control signals to be used at a later point in the system pass. In the first part of the antenna cable, true control signals, data traffic and all virtual control signals are present. In the leaking cable part 13A, one of the virtual control signals is filtered away. In the leaking cable part 13B, another one of the virtual control signals is filtered away. In the leaking cable part 13C, only the true control signals are left. The identification of the position then has to be based on which combinations of control signals that are possible to detect. The mobile terminal 6 in FIG. 11 experiences the true control signal corresponding to the true cell 4 but only one single virtual control signal. A probable position is therefore in an area only covered by one virtual cell.

The following sections describe in more detail the neighbor list and the virtual cell ID position estimation in GSM according to the above-presented preferred injector-related embodiment of the present invention in connection with FIG. 10.

The control signal injector 21 includes a GSM transmitter that generates N network configurable BCCH carriers (f_1, ..., f_N) containing a frequency correction burst and a synchronization burst (including a network configurable BSIC_1, ...,BSIC_N) but otherwise only contains random GMSK (Gaussian Minimum Shift Keying) modulated data. The control signal injector 21 output is added (combined) to the IBTS (Base Transceiver Station) signal output (which contains BCCH carrier f_0 and traffic channels f_TCH1, ..., f_TCHn) and transmitted on the distributed antenna system. The handover neighbor list in the BCCH carrier f_0 contains the frequencies f_1, ..., f_N, so that the mobile terminal 6 is instructed to measure the signal strength of these frequencies.

At antenna number k, there is a signal selector 22 comprising a band pass filter with band pass covering frequencies f_0, f_TCH1, ..., f_TCHn used by the BTS and the frequency f_k, where f_k is one frequency in the set of f_1, ..., f_N, used by the control signal injector 21. The mobile terminal 6 close to antenna number k will typically then receive the regular BTS frequencies f_0, f_TCH1, ..., f_TCHn and f_k.

There are two preferred ways to transfer signal strength measurements to a server performing the position estimation.

1. The BSC knows that f_1, ..., f_N are not true handover candidates and discard any measurements for that purpose. It can then forward the measured signal strengths to the positioning server.

2. The BSC is not aware that f_1, ..., f_N are virtual carriers but f_1, ... ; f_N are still made part of the neighbor list through OSS. To avoid handover attempts to these virtual frequencies the BSC may store a BSIC_k2 for f_k, where BSIC_k≠BSCI_k2. When receiving the measurement report the BSC can conclude that the wrong cell has been measured. In this implementation the mobile terminal must have other means to transfer the measurement report, e.g. via SIM Application Toolkit.

The actual position estimation can be performed at a node in the main communication network, e.g. a base station, in the mobile terminal itself or in a distributed manner. Often, there is a wish that the delay between the request of being positioned and having the final position estimation should be as low as possible. In such cases, a solution where the terminal can determine its own position without sending a request to the system is an advantage.

Figure 12A:
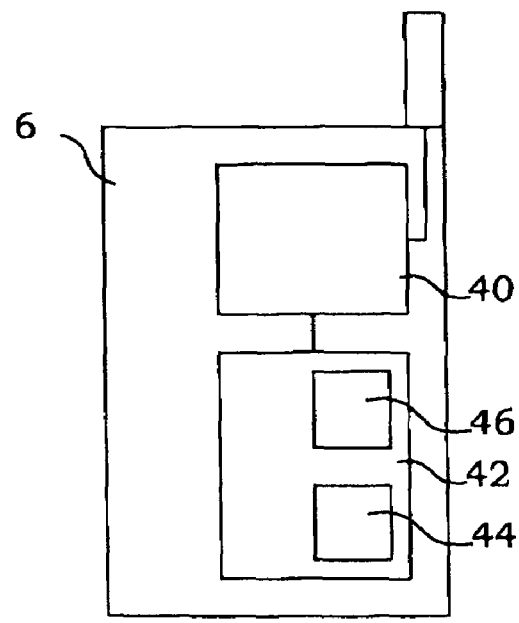
FIG. 12A and 12B are a block diagrams of embodiments of a mobile terminal useful with the present invention.

In FIG. 12A, a block diagram of an embodiment of a mobile terminal 6 is illustrated. The mobile terminal 6 comprises a receiver 40, which is responsible for reception of both control signals and data traffic. A position estimator 42 is connected to the receiver 40 for transferring of information concerning received control signals. The position estimator comprises a neighbor list 44, in which conditions regarding surrounding base stations, real ones or virtual ones, are compiled. The position estimator further comprises a database 46 having relations between base station identity data and associated positions. Such database is preferably loaded down from the cellular network upon originally connecting to the network. With use of the neighbor list 44 and the database 46, the position estimator 42 can perform a determination of a probable position for the mobile terminal 6 according to conventional principles.

Figure 12B:
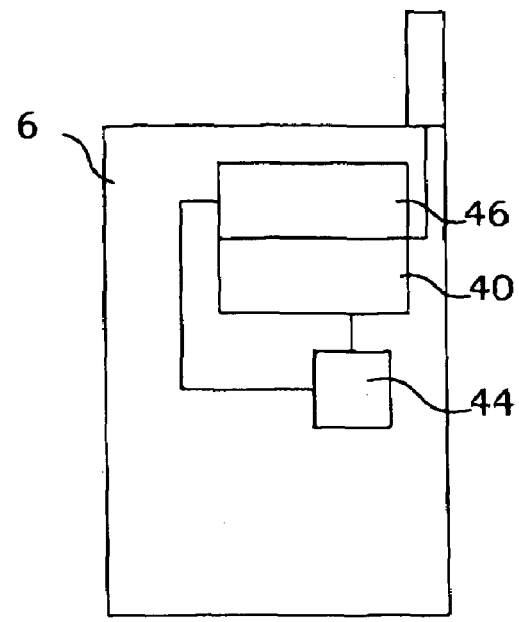

In FIG. 12B, a block diagram of another embodiment of a mobile terminal 6 is illustrated. In this case, the actual position estimation is performed at the base station. Here, the mobile terminal 6 comprises a receiver 40 and a is neighbor list 44. The content of the neighbor list 44 is not evaluated locally in the mobile terminal 6 but instead, the content of the neighbor list 44 is transferred via transmitter 46 to the base station.

Figure 13:
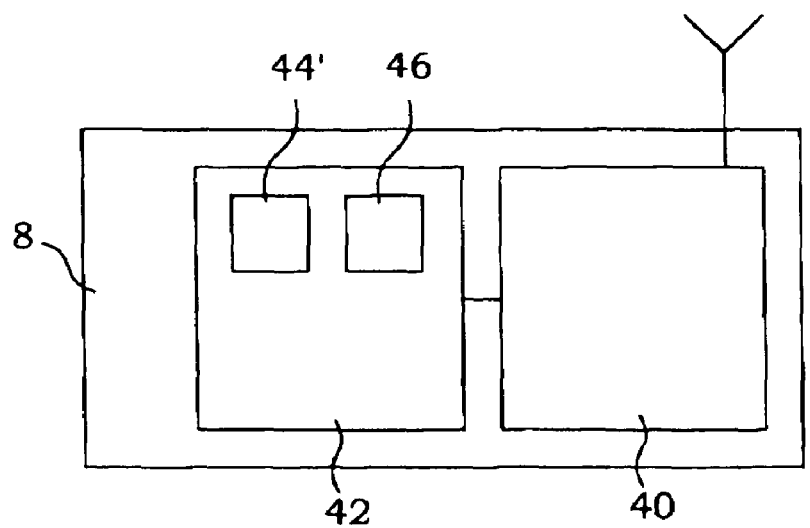
FIG. 13 is a block diagram of an embodiment of a base station useful with the present invention.

In FIG. 13, a block diagram of a corresponding base station is illustrated. The base station 8 comprises a receiver 40, connected to a position estimator 42. The position estimator 42 comprises or has at least access to a database 46 storing relations between cell-IDs and positions. A copy 44' of the neighbor list of the mobile terminal is also available in the position estimator. With use of the neighbor list copy 44' and the database 46, the position estimator 42 can perform a determination of a probable position for the mobile terminal according to conventional principles.

Figure 14:
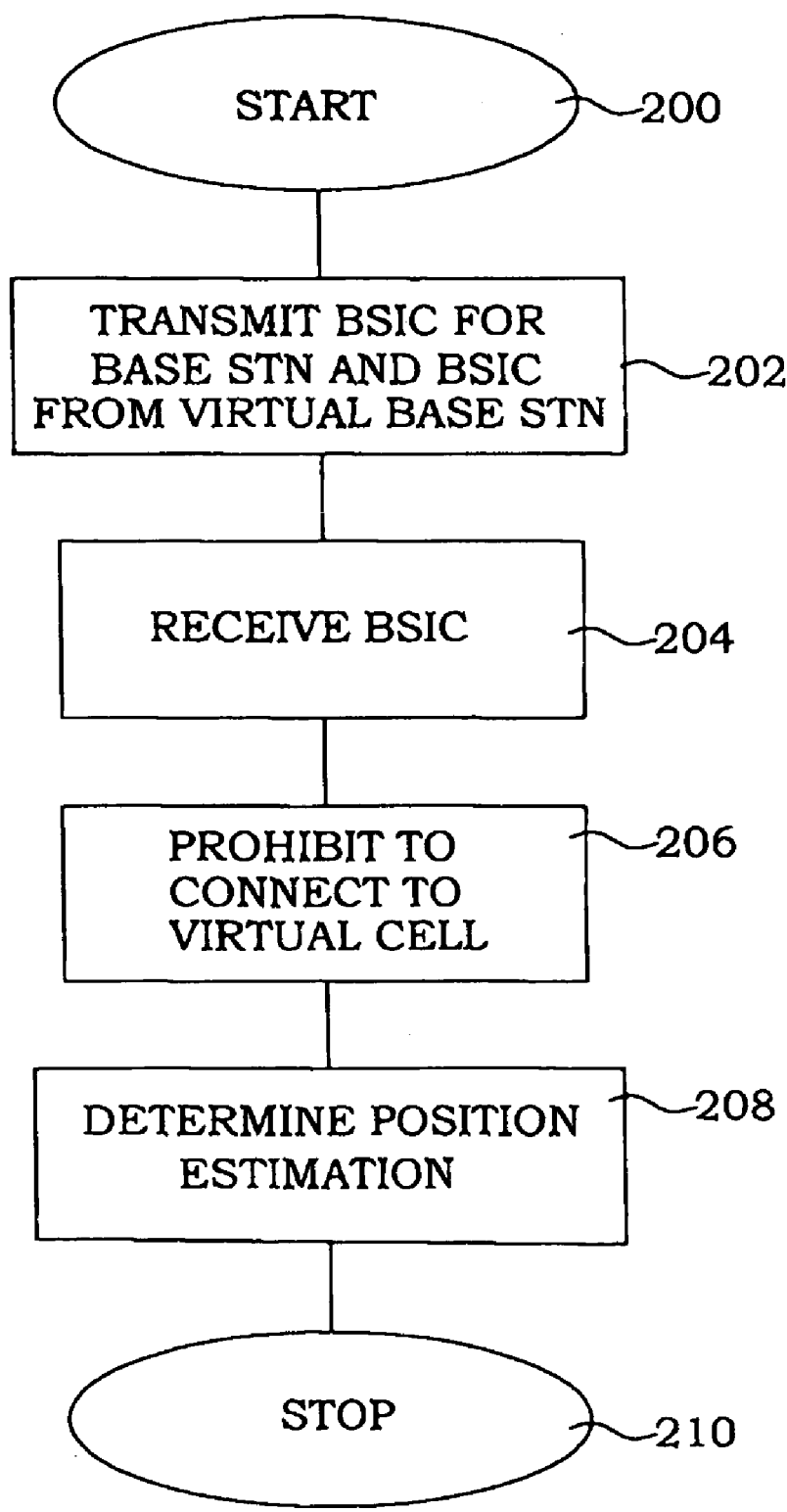
FIG. 14 is a flow diagram illustrating the main steps of an embodiment of a method according to the present invention.

FIG. 14 illustrates a flow diagram over the main steps in an embodiment of a method according to the present invention. The procedure starts in step 200. In step 202, BSIC or other bas station identification data for base stations and virtual base stations are transmitted in control signals. The transmitted control signals are received by a mobile terminal in step 204. In step 206, means are applied to prohibit or prevent the mobile terminal from connecting to the virtual base station(s). Finally, in step 208, a position of the mobile terminal is determined based on received control signals for base stations as well as for virtual base stations. The procedure ends in step 210.

So far, only position estimation methods based on Cell-ID are discussed. To enhance the accuracy of the position determination, it is also possible to combine the present invention with more advanced positioning methods, such as e.g. time difference methods or fingerprint methods.

The exemplary embodiments in this disclosure are primarily directed to areas equipped with a distributed antenna system, leaking cable system and/or ,systems comprising antennas fed by a repeater. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood by those skilled in the art that various modifications and changes may be made to the present invention without departure from the scope thereof, which is solely defined by the appended claims. In particular, part systems of different embodiments are understood to be possible to combine in any combinations as long as this is technically possible.

The invention claimed is:

1. Method for position determination of a mobile station in a mobile communications network, comprising the steps of:
   transmitting control signals in the mobile communications network,
   the control signals comprising base station identification data,
   at least one of the control signals comprising virtual base station identification data;
   the mobile station being unable to connect to the mobile communications network using a virtual cell associated with the virtual base station identification data;
   the base station identification data being associated with a transmission location of the control signal comprising the base station identification data;
   receiving transmitted control signals in the mobile station, wherein base station identification data and characteristics of the control signals are provided for inclusion in a neighbor list for the mobile station;
   determining an estimation of a position of the mobile station based on characteristics of the received control signals and the base station identification data based on the transmission location associated with the virtual base station identification data being included in the neighbor list for the mobile station; and
   reducing a probability of the mobile station attempting to connect to the mobile communications network using the virtual cell associated with the virtual base station identification data included in the neighbor list.

2. Method according to claim 1, comprising the further step of:
   prohibiting the mobile station to attempt connecting to the mobile communications network using the virtual cell associated with the virtual base station identification data.

3. Method according to claim 2, wherein the step of prohibiting comprises the step of incorporating information indicating unavailability of the virtual base station identification data in the at least one of the control signals comprising the virtual base station identification data.

4. Method according to claim 3, wherein information indicating unavailability is a flag in the control signals.

5. Method according to claim 1, wherein the step of reducing the probability comprises the step of controlling transmission power of the at least one of the control signals comprising the virtual base station identification data.

6. Method according to claim 5, wherein the transmission power of the at least one of the control signals comprising the virtual base station identification data is controlled to give a received power at a mobile station positioned anywhere in a coverage area of the mobile communications network that is significantly lower than a received power of at least one control signal comprising real base station identification data.

7. Method according to claim 6, wherein the at least one of the control signals comprising the virtual base station identification data is transmitted from the same position as at least one control signal comprising real base station identification data, whereby the transmission power of the at least one of the control signals comprising the virtual base station identification data is controlled to be lower than the transmission power of the at least one control signal comprising real base station identification data transmitted from the same position.

8. Method according to claim 1, wherein the step of reducing the probability comprises the step of controlling signal-to-noise ratio of the at least one of the control signals comprising the virtual base station identification data.

9. Method according to claim 8, wherein the step of controlling the signal-to-noise ratio comprises addition of noise to the control signals comprising the virtual base station identification data.

10. Method according to claim 1, wherein devices associated with the virtual base station identification data are located within an area covered by an antenna system selected from the list of:
    distributed antenna system, and
    leaking cable system.

11. Method according to claim 10, comprising the steps of:
    providing, in a base station for the antenna system, control signals comprising virtual base station identification data;
    distributing the control signals comprising virtual base station identification data on a common antenna connection; and
    selecting respective ones of the control signals comprising virtual base station identification data at different positions in the antenna system, for transmission of the selected control signal on a radio interface.

12. Method according to claim 1, wherein devices associated with the virtual base station identification data are located within an area covered by a repeater equipped system.

13. Radio network of a mobile communications network, comprising:
    transmitters arranged for transmitting control signals to a mobile station,
    the control signals comprising base station identification data;
    at least one of the control signals comprises virtual base station identification data;
    the mobile station being unable to connect to the mobile communications network using a virtual cell associated with the virtual base station identification data;
    the base station identification data being associated with a location of the transmitter transmitting the base station identification data;
    a receiver in the mobile station arranged for collecting information associated with characteristics of the control signals when received at the mobile station and for extracting the base station identification data and for providing base station identification data and characteristics of the control signals for inclusion in a neighbor list for the mobile station; and
    positioning determining circuitry connected to the receiver and arranged to determine a position estimate of the mobile station based on characteristics of the received control signals and the base station identification data at least based on the transmitter location associated with the virtual base station identification data being included in the neighbor list for the mobile station; and
    means for reducing the probability of the mobile station attempting to connect to the mobile communications network using the virtual cell associated with the virtual base station identification data included in the neighbor list for the mobile station.

14. Radio network according to claim 13, further comprising:
    at least one device associated with each virtual base station identification data, whereby the mobile station being unable to connect to the mobile communications network via the at least one device.

15. Radio network according to claim 14, wherein at least one of the at least one device is a transmitter.

16. Radio network according to claim 14, wherein at least one of the at least one device is a selector means connected to a transmitter for control signals comprising real base station identification data.

17. Radio network according to claim 16, wherein the selector means is arranged to suppress all control signals comprising virtual base station identification data except one.

18. Radio network according to claim 16, wherein the base station comprises means for providing control signals comprising virtual base station identification data.

19. Radio network according to claim 13, further comprising a base station and an antenna system selected from the list of:
   distributed antenna system, and
   leaking cable system.

20. Radio network according to claim 13, further comprising a repeater in the antenna system.

21. Mobile communications network, comprising:
   transmitters arranged for transmitting control signals to a mobile station,
   the control signals comprising base station identification data;
   at least one of the control signals comprises virtual base station identification data;
   the mobile station being unable to connect to the mobile communications network using a virtual cell associated with the virtual base station identification data;
   the base station identification data being associated with a location of the transmitter transmitting the base station identification data;
   receiver means in the mobile station arranged for collecting information associated with characteristics of the control signals when received at the mobile station and for extracting the base station identification data and for providing base station identification data and characteristics of the control signals for inclusion in a neighbor list for the mobile station; and
   positioning means, communicational connected to the receiver means, the positioning means being arranged to determine a position estimate of the mobile station based on characteristics of the received control signals and the base station identification data at least based on the transmitter location associated with the virtual base station identification data included in the neighbor list for the mobile station; and
   means for reducing a probability of the mobile station attempting to connect to the mobile communications network using the virtual cell associated with the virtual base station identification data being present in the neighbor list for the mobile station.

* * * * *

UNITED STATES PATENT AND TRADEMARK OFFICE
CERTIFICATE OF CORRECTION

PATENT NO. : 7,194,275 B2  Page 1 of 1
APPLICATION NO. : 10/953502
DATED : March 20, 2007
INVENTOR(S) : Bolin et al.

It is certified that error appears in the above-identified patent and that said Letters Patent is hereby corrected as shown below:

In Column 16. Line 11, in Claim 10, after "system," delete "and".

In Column 16. Line 12, in Claim 10, after "cable system" insert -- , and combinations thereof --.

Signed and Sealed this

First Day of April, 2008

JON W. DUDAS
*Director of the United States Patent and Trademark Office*